W. M. JEWELL.
FILTER.
APPLICATION FILED MAY 15, 1913.
1,158,226.
Patented Oct. 26, 1915.
3 SHEETS—SHEET 1.
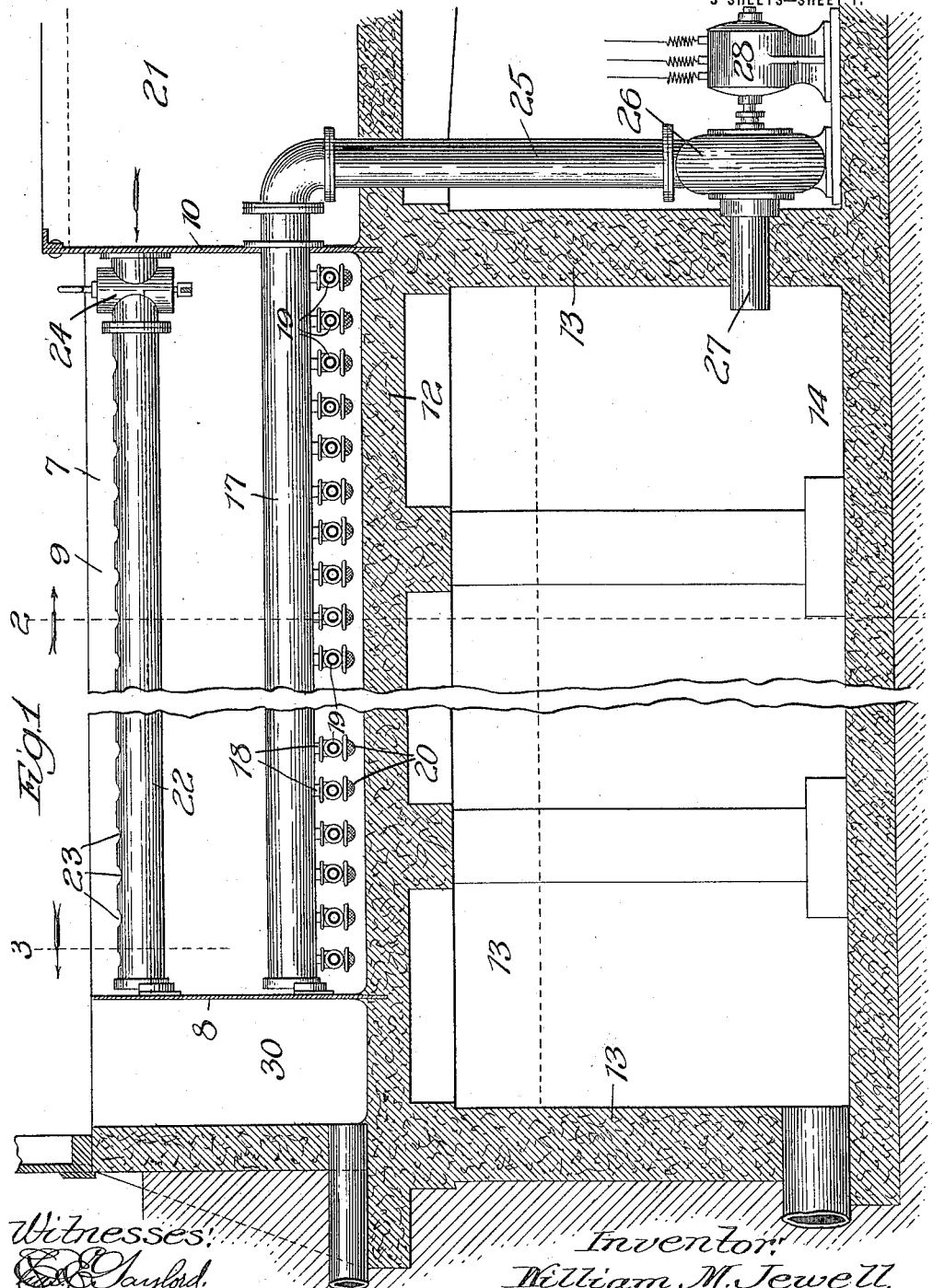
Witnesses:
Inventor:
William M. Jewell, W. M. JEWELL.
FILTER.
APPLICATION FILED MAY 15, 1913.
1,158,226.
Patented Oct. 26, 1915.
3 SHEETS—SHEET 2.
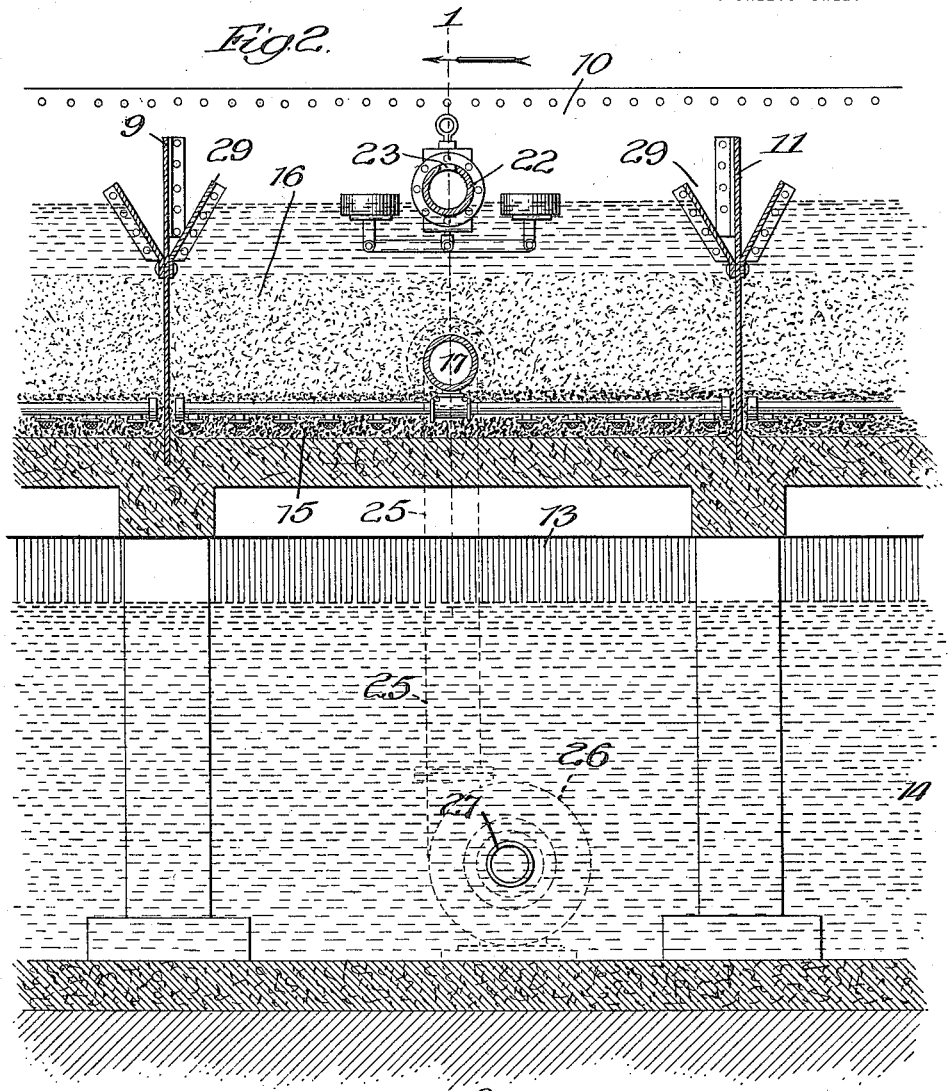
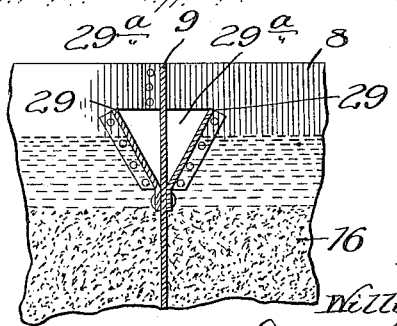
Witnesses:
Inventor:
William M. Jewell,
By Dyrenforth, Lee, Chritton & Wiles,
Attys.

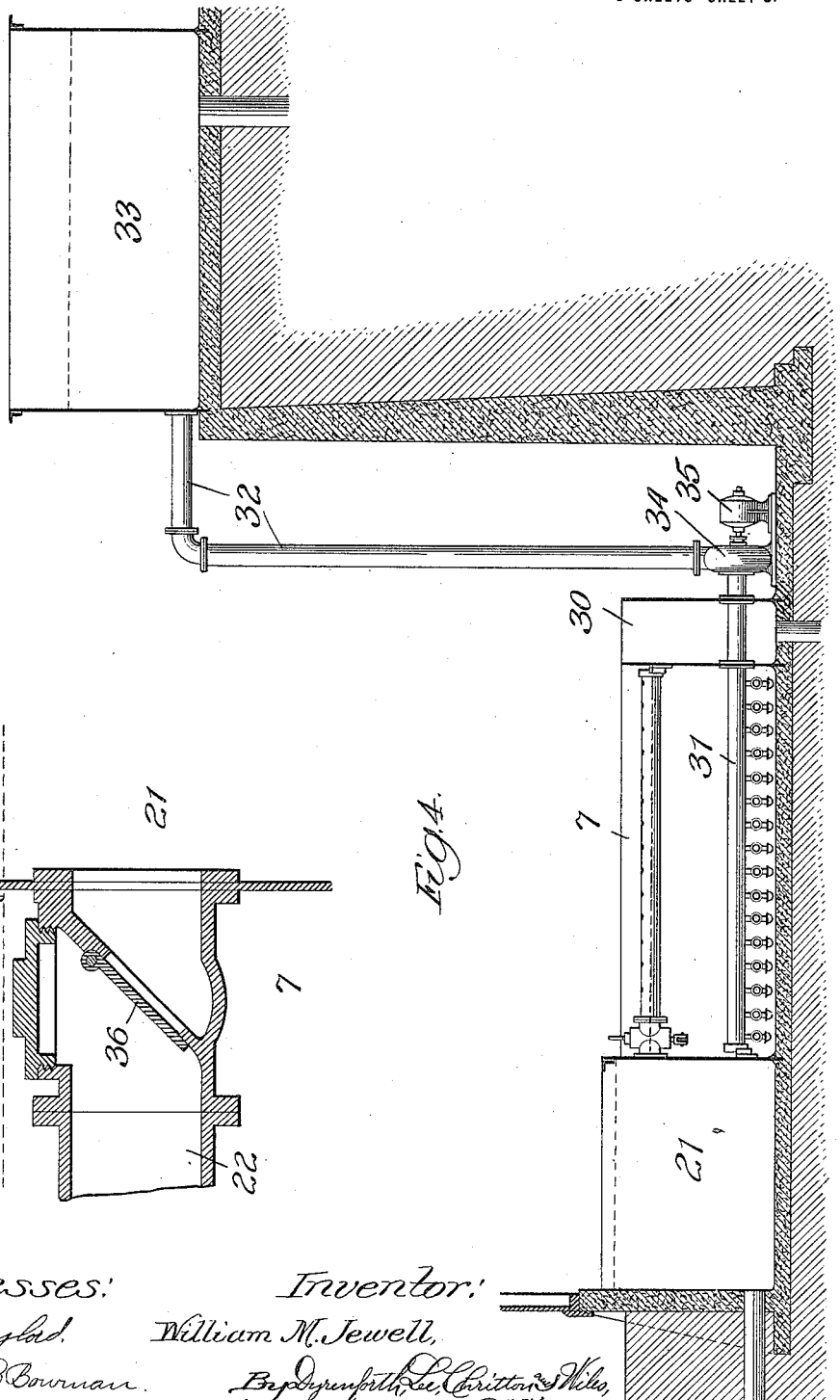

UNITED STATES PATENT OFFICE.

WILLIAM M. JEWELL, OF CHICAGO, ILLINOIS, ASSIGNOR TO JEWELL ENGINEERING COMPANY, OF CHICAGO, ILLINOIS, A CORPORATION OF ILLINOIS.

FILTER.

1,158,226.      Specification of Letters Patent.      Patented Oct. 26, 1915.

Application filed May 15, 1913. Serial No. 767,807.

*To all whom it may concern:*

Be it known that I, WILLIAM M. JEWELL, a citizen of the United States, residing at Chicago, in the county of Cook and State of Illinois, have invented a new and useful Improvement in Filters, of which the following is a specification.

My invention relates more particularly to filters of the type employing a granular filter-bed through which the liquid to be filtered percolates and wherein provision is made for reversing the flow of liquid through the filter-bed to cleanse it of the impurities removed from the liquid filtered therein.

Filters of the above-referred to type as heretofore commonly constructed employ a relatively large number of valves for controlling the supply of unfiltered water to the filter, the supply of filtered water thereto for washing purposes, the control of the wash-water outlet and communication between the filter and the storage tank for the filtered water, the use of such valves presenting many disadvantages chiefly among which are the relatively high cost for the valves, the necessity of using a relatively large amount of piping, the loss of time in manipulating the valves, the cost of labor required in such operation and the loss of water, the disadvantages arising from the employment of valves as stated, being especially pronounced where the filtering apparatus is employed for filtering water on a large scale, as for example in the filtration of the water supply of a city.

My object is to provide improvements in filters of the type above referred to to the end of reducing the cost of construction and operation thereof, conserving the water and preventing contamination thereof, and producing reversal of operations in the filter without undue loss of time.

Referring to the accompanying drawings, Figure 1 is a longitudinal broken sectional view in elevation of a filter apparatus constructed in accordance with my invention. Fig. 2 is a section taken at the line 2 on Fig. 1 and viewed in the direction of the arrow. Fig. 3 is a section taken at the line 3 on Fig. 1 and viewed in the direction of the arrow. Fig. 4 is a view similar to Fig. 1 of a filtering apparatus constituting another embodiment of my invention; and Fig. 5, a broken view in longitudinal vertical sectional elevation of a modification of the valve for controlling the flow of water to be filtered into the filter.

While my improved apparatus may be employed where the filter element is provided as a single unit, and where the apparatus is to be of either large or small capacity, it is especially adapted for and primarily designed to be used where a plurality of filter units are employed and where the filtering apparatus is required to have relatively great capacity, the one filtering unit illustrated in the drawings, however being sufficient to illustrate my invention.

Referring particularly to the apparatus illustrated in Figs. 1, 2, and 3, the filtering chamber into which the water to be filtered is introduced, as hereinafter described, is represented at 7 and is formed of walls, 8, 9, 10 and 11, preferably of sheet steel embedded at their lower edges in a concrete floor section 12, which latter is supported from walls 13 forming a chamber 14 beneath the filter-chamber 7 for receiving the filtered water discharged from the filter-chamber as hereinafter described.

The type of filter illustrated is commonly known as the gravity type, the filter-bed of which is preferably formed of a layer of coarse gravel 15 on which is superposed a layer 16 of sand of the desired depth, through which sand and gravel, the water to be filtered, percolates for the separation therefrom of its contained impurities, the water thus filtered thence flowing from the filter to the point of storage or use.

In the apparatus illustrated the chamber 7 contains a pipe 17 extending lengthwise thereof and is provided at intervals with depending nipples 18 which open into branch-pipes 19 each provided at intervals along its under side with perforated heads 20, these pipes, which constitute the means for collecting the filtered water, being preferably so arranged that the heads 20 and pipes 19 will be buried in the coarse gravel 15.

In the arrangement illustrated a tank 21 adjoins the filter-chamber 7, this tank being provided for the purpose of mixing with the water to be filtered a coagulating substance, as is the common practice in water filtration, though my invention is not limited to the use of such a tank. The tank 21 opens into a pipe 22 which extends lengthwise of the filter-chamber 7 and is provided with outlets 23 at intervals along its upper side, whereby the filter-chamber 7 is charged with water to be filtered from the tank 21. In the arrangement shown, the water is maintained in the tank 21 at a level considerably above the level to be maintained in the filter-chamber 7, and to provide for the maintenance of the water in the chamber 7 at the desired level, the pipe 22 is equipped with an automatically operating valve represented at 24, that shown being a standard balanced double-disk float valve.

The pipe 17 opens into a pipe 25 which latter opens into the casing of a pump indicated at 26, the suction end of the pump in the particular arrangement shown in Figs. 1, 2, and 3, opening into a pipe 27, which extends into and communicates with the interior of the filtered-water chamber 14. Any suitable fluid-moving mechanism and operating means therefor may be employed, that illustrated representing diagrammatically a centrifugal pump driven by an electric motor indicated at 28.

In the operation of the apparatus illustrated, water constantly flows from the tank 21 through the pipe 22 into the filter-chamber 7 to maintain the water therein at the level indicated in Fig. 2, the water in the chamber 7 percolating by gravity through the filter-bed formed of the gravel 15 and sand 16, from which it flows in purified condition into the heads 20 and pipes 19 and thence into the pipe 17 from which it discharges by gravity through the pump 26 (the pump in this operation being idle), and thence through the pipe 27 into the filtered water chamber 14. The filtering action just described is permitted to continue until the impurities removed from the water by the filter have accumulated in the latter to such a degree that cleasing of the filter-bed is desirable, whereupon the pump 26 is started, by the operator, or by any desirable automatic mechanism (not shown), to produce a counterflow of filtered water through the pipes 27, 25 and 17, together with the water-collecting branches of the last referred to pipe, which causes wash-water to flow upwardly through the gravel and sand bed in the chamber 7 with a velocity, as is well understood in the art, sufficient to separate the grains of sand in order that they may be washed free of the deposits thereon. The wash-water thus introduced into the filter may be conducted away from the latter by overflowing into troughs 29 at a level above the unfiltered water level maintained in the filter-chamber 7 during the filtering operation by the action of the valve 24, the said trough communicating, through openings 29ª in the wall 8, with a channel 30 forming a drain, which may, if desired, lead to a sewer, it being understood that as the valve 24 serves to permit water to enter the chamber 7 from the chamber 21, only when the water level in the chamber 7 drops below that indicated in Fig. 2, this valve will automatically close and remain closed during the operation of washing the filter as described, thus shutting off the supply of raw water to the filter and preventing the wash-water from being forced into the raw water tank 21.

It will be understood from the foregoing that the operation of the pump 26 for causing a current of water to flow from the filtered water supply into the collecting pipes of the filter in a direction reverse to that taken by the filtered water in flowing from the filter into the tank 14, automatically, so to speak, not only causes filtration to be discontinued, but also operates to shut off the supply of unfiltered water to the filter-chamber 7.

In Fig. 5 I have illustrated a modification of the apparatus shown in the preceding figures. In this case the storage tank for the filtered water, instead of being located below the filter and receiving the filtered water by gravitation from the filter, is located above the filter and fluid-moving means are provided for lifting the filtered water into the tank. In this arrangement the main-draw off pipe of the filter for the filtered water is represented at 31, this pipe corresponding to the pipe 17 and connecting with a pipe 32 opening into the filtered water tank 33, and containing a pump 34 driven in any suitable manner as from an electric motor 35, the pump 34 being of such construction as will cause it, when operated, to pump water from the pipe 31 into the tank 33, but permit water from the tank 33 to flow through the pipe 32 into the pipe 31 and thence through the filter, when the pump is idle.

The means for supplying the filter-chamber 7 with water to be filtered, the means for collecting the filtered water in the chamber 7, and the means for disposing of the wash-water, are the same as those described of the construction illustrated in Figs. 1, 2, and 3, the only difference being that the positions of the tank 21 and trough 30 are reversed to reduce to the minimum exterior exposure of the piping to the action of water outside of the filter-chamber 7.

It will be readily understood from the foregoing that the operation of the construction just described is the same as that of the preceding figures, excepting that during the filtering operation the pump 34 is operated to raise the water into the tank 33, and when it is desired that the filter be washed the pump 34 is stopped, thus permitting filtered water from the chamber 33 to flow by gravity into the filter-chamber 7 as explained in connection with the previously described construction.

It will be understood that where the water enters the filter-chamber 7 from a tank such as the tank 21, wherein the water is to be maintained at a level above that desired to be maintained in the chamber 7, the valve 24 of the type illustrated, or any other suitable water-level controlling means, may be provided.

In Fig. 5 I have illustrated a form of valve which may be used where the source of water supply for the chamber 7 is maintained at a level corresponding with the level at which it is desired that the water in the chamber 7 be maintained. This valve, which is in the form of a swinging check-valve and represented at 36, is interposed in the pipe 22, it being understood that in this case the tank 21 would have the water therein maintained at a level corresponding with the level of the water to be maintained in the chamber 7. Under some conditions it may be desirable to locate the filter and the filtered-water-receiving chamber on substantially the same plane and in such case it would be necessary to provide means for forcing the filtered water into the filtered-water-receiving chamber during the filtering operation and to force filtered water back into the filter for washing out the latter. Any desirable means for thus driving the water may be provided, such modification of the apparatus illustrated being within my invention.

The provision of fluid-moving means in the filtered water outlet from the filter is of importance in filtering apparatus, as it dispenses with the use of certain valves which in large filtering plants are of relatively great size and thus expensive to install and operate. The provision of a wash-water outlet in the filter-chamber above the level at which the water is maintained in the latter during the filtering operation, is also of practical importance in filtering apparatus, as by this feature certain other valves, as heretofore commonly provided, are dispensed with. Furthermore, by constructing a filtering apparatus in accordance with my invention, the amount of piping required to be used is reduced to the minimum with consequent advantages and the amount of pipe area subjected to surrounding water is likewise reduced.

While I have illustrated and described certain specific constructions constituting embodiments of my invention, I do not wish to be understood as intending to limit it to such construction, as the same may be variously modified and altered without departing from the spirit of my invention, it being my intention to claim my invention as fully and completely as the prior art will permit.

What I claim as new and desire to secure by Letters Patent is:

1. In a filtering apparatus the combination of a chamber containing a filtering-bed, means for supplying water to be filtered to said chamber, means for conducting the filtered water away from said bed, means for causing wash-water to pass through said bed in a direction opposite to the flow of water therethrough in the filtering operation through the same conducting means and overflow from said chamber, and means for preventing the incoming water to be filtered from rising in said chamber to the point of overflow of the wash-water therefrom.

2. In a filtering apparatus the combination of a chamber containing a filtering-bed, means for supplying water to be filtered to said chamber, means for conducting the filtered water away from said bed, means for causing wash-water to pass through said bed in a direction opposite to the flow of water therethrough in the filtering operation through the same conducting means and overflow from said chamber, and means operating automatically to close said chamber to the supply of incoming water to be filtered when the water in said chamber reaches a predetermined level below the point of overflow of the wash-water therefrom.

3. In a filtering apparatus, the combination of a chamber containing a filtering-bed, a conduit communicating with said chamber for conducting the filtered water therefrom, and fluid-forcing means in said conduit, for the purpose set forth permitting a free flow of water therethrough when idle.

4. In a filtering apparatus, the combination of a chamber containing a filtering-bed, a filtered-water receiving reservoir, a conduit leading from said filtering chamber into said filtering water reservoir for conducting the filtered water to the latter, and fluid-forcing means in said conduit, for the purpose set forth permitting a free flow of water therethrough when idle.

5. In a filtering apparatus, the combination of a chamber containing a filtering-bed, a conduit communicating with said chamber for conducting the filtered water therefrom, and fluid-forcing means in said conduit constructed and arranged to permit the filtered water to flow therethrough in one direction when said means are idle and to force filtered water through said conduit in the contrary direction when said means are operating.

6. In a filtering apparatus, the combination of a chamber containing a filtering-bed, a reservoir below said chamber for the filtered water, a conduit leading from said filtering chamber into said reservoir, and fluid-forcing means in the same conduit for forcing wash-water from said reservoir into and through said bed.

7. In a filtering apparatus, the combination of a chamber containing a filtering-bed, a conduit communicating with said chamber for conducting the filtered water therefrom, and means in the same conduit for forcing wash-water through said conduit in a direction opposite to the flow of filtered water therethrough.

8. In a filtering apparatus, the combination of a chamber containing a filtering-bed, a valveless conduit communicating with said chamber for conducting the filtered water therefrom, and means in the same conduit for forcing wash-water through said conduit in a direction opposite to the flow of filtered water therethrough said means permitting a free flow of water therethrough when idle.

9. In a filtering apparatus, the combination of a chamber containing a filtering-bed and having a fixed overflow, means for supplying water to be filtered to said chamber, means for conducting the filtered water away from said bed, means for causing wash-water to pass through said bed in a direction opposite to the flow of water therethrough in the filtering operation and pass out through said overflow, and means for preventing the water to be filtered from rising in said chamber to the level of said overflow.

WILLIAM M. JEWELL.

In presence of—
D. C. THORSEN,
O. C. AVISUS.

Copies of this patent may be obtained for five cents each, by addressing the "Commissioner of Patents, Washington, D. C."